Patented Oct. 27, 1942

2,299,745

UNITED STATES PATENT OFFICE 2,299,745

PRESERVATION OF FODDER

Otto Hansen, Copenhagen, Denmark, assignor to Aktieselskabet Maelkeriet "Enigheden," Copenhagen, Denmark No Drawing. Application October 9, 1939, Serial No. 298,723. In Denmark October 12, 1938

8 Claims. (Cl. 99—9)

In the preservation of green fodder the object is to prevent the objectionable processes by which the fodder is deteriorated or the value of it considerably decreased during the winter season. Such preservation may be obtained by depositing the fodder in such manner as to substantially exclude the admission of air and acidifying the fodder so as to adjust its pH to a value of abt. 4.5–4 or beneath before the objectionable processes such as the development of butyric acid and putrefaction have yet started.

It is well known to undertake such preservation by spraying the fodder, layer by layer, during the deposition thereof in suitable containers or silos with a suitable diluted acid, particularly a mixture of sulphuric acid and hydrochloric acid. The use of such acids, however, is disagreeable and dangerous, and generally it will be considered unappealing to use such acids for fodder.

It is also well known to leave the fodder deposited in similar manner without the addition of acid to stand which will cause a lactic acid fermentation to develop spontaneously in the fodder, but this method is not sure and will cause a considerable loss in foddering value, even when it is followed by success. The reasons for this loss is on the first hand, that the pH-value is not generally reduced sufficiently to prevent a decomposition of the proteins of the product to progress therein and on the other hand, that the formation of the acid will take place so slowly that undesirable bacterial and enzymatical processes will prevail to a considerable degree.

Again, it is known to support the formation of lactic acid by adding to the fodder either a culture of lactic acid bacteria or molasses but it has not been possible thereby to depress the pH-value sufficiently rapidly or sufficiently far to avoid the drawbacks mentioned.

The purpose of the present invention is to obtain a preservation of green fodder by depositing the same under conditions by which the admission of air thereto or at least to the interior parts thereof will be prevented. This corresponds to the known process generally called ensilage. The object is to cause in the mass of fodder a development of lactic acid and other palatable acids in the biological way which development, in contradistinction to known ensilaging processes in which the acidification of the fodder is produced biologically, is so rapid as to secure the complete predominance of this useful biological process over undesired biological and enzymatical processes which are illustrated by putrefaction or the production of acids, such as butyric acid, that are not palatable to the cattle and other domestic animals. At the same time the biological acidification must go so far that the fodder will be preserved for the desired time as soon as the final pH has been arrived at. Excellent keeping qualities have been found with processes in which the pH has been decreased to approximately between 4.45 and 4.25; at least the pH-value must be carried below 5.

According to the present invention this is obtained by adding to the green fodder during the ensilage process, i. e. during the deposition of it into containers certain substances promoting the production in the mass of lactic acids and other desirable acids.

One object of the present invention is the preservation of green fodder by adding thereto during the deposition lactic acid bacteria, yeast, diastase, starch and sugar and covering the fodder to substantially prevent the admission of air thereto, and leaving the fodder to stand to develop acid therein.

Another object of the invention is to find the most suitable manner in which the said necessary additions may be grouped and added to the fodder.

With these general statements of the objects and purposes of my invention I will now proceed to describe the embodiment thereof and the manner in which my invention is carried out and it will be understood that while I have described what may be considered as a preferable embodiment of my invention, I do not limit myself to the precise conditions or proportions herein set forth as they may be varied by those skilled in the art in accordance with the particular circumstances, such as the kind of fodder for which they are intended, the conditions under which they are to be utilised, and the character or sources of yeast, diastase, starch and sugar available.

The green fodder which it is desired to preserve is placed into a silo of impregnated wood buried in the earth. Other kinds of silos may be used when it is taken into consideration that the preserved fodder will be rather acid so that materials which are not resistant to acid must be suitably protected. The silo, in a particular series of experiments that has been carried out, was only 2 meters in diameter and 1.5 meters in depth but preferably greater silos shall be used. In the said series of experiments the bottom of the silo was drained so as to prevent the juice given off by the fodder to gather in the bottom but this is not absolutely necessary. In view of the fact that the fodder, after having been deposited in the silo, will settle considerably it is preferable to use a construction prolonging the said walls of the silo upwards during the filling of the silo. This construction, in the case of the small silos above described, is about 1 meter high and permits a quantity of fodder to be filled in which after settling will approximately fill the silo buried in the earth. After settling which takes place in the course of 3–4 days, the said construction is removed and the cover is arranged for the preservation. This arrangement is only for the purpose of making the silos cheap and has nothing particularly to do with my present invention.

The green fodder, e. g. grass, is deposited in the silo by filling it in layer by layer. Each layer is levelled and the substances to be added to promote the development of lactic acid are applied in the liquid form by spraying over the surface of the layer in a proportion corresponding to the quantity of fodder contained in the layer, after which the next layer is applied, spread with the fluid and so on. The deposition is continued until the required height has been obtained in the silo in question or until all the fodder has been deposited. In the case of the series of silos described and the deposition of the fodder, layer by layer, is continued until the fodder reaches the top of the construction placed over the buried part of the silo.

After the last layer has been deposited and wetted by spraying, a suitable cover is placed over it. The cover may be formed by a weightened plate, e. g. a plate of wood covered by a layer of earth. In the case of the silos of the experiments above referred to, the fodder is covered by clean bags which are again covered by earth. After the mass has settled and the construction mentioned above has been removed, care is taken to repair the said covering so that it will be approximately airtight.

The liquid by which the mass is thoroughly impregnated during the deposition thereof in the silo, according to my invention, must contain lactic acid bacteria, yeast, diastase, starch and sugar.

In the preferred embodiment of my invention this liquid is produced in the following manner.

The materials are grouped in three groups called the lactic acid bacteria culture, the malt culture and the concentrated sugar solution respectively.

The lactic acid bacteria culture in this embodiment contains lactic acid bacteria in a sugar-containing liquid, the malt culture, so-called, contains starch, diastase, and yeast together with some lactic acid bacteria and water and the sugar produced by the activity of the diastase on the starch. The sugar solution is a concentrated one and contains an amount of sugar which is great in comparison with the sugar contained in the lactic acid bacteria culture and the malt culture.

The lactic acid bacteria culture in the preferred embodiment of my invention is produced by propagating a pure culture of lactic acid bacteria such as B. cremoris, streptococcus lactis or streptobacterium plantarum in skimmed milk. One way of doing this is to mix to each liter of skimmed milk 100 grams of the acidifying culture generally used in dairies and leave the mixture to stand for 24 hours at 22–25° C. Other waste products from the milk-treating trades, for instance dairies, may be used with an equal result, for instance butter-milk, provided that such products contain milk-sugar in a reasonable concentration.

The malt culture, so-called, in the preferred embodiment of the invention, is produced by adding to each 40 liters of water at about 62° C. 1.3 kgs. of germs of barley and 2.6 kgs. of rye flour. The mass thus produced is left standing for 6 hours in order to produce sugar therein. It is then cooled to 22–25° C. after which 1 liter of a mixed culture of saccharomyces cereviciae is added and the whole is left to stand for about 24 hours. This malt culture contains, in addition to yeast cells, a considerable amount of lactic acid bacteria. The mixed culture can be commercially obtained as it is used for producing acid-dough for baking purposes. The said mixed culture may be replaced by yeast alone and surface-yeast is preferable to bottom-yeast and to press-yeast, although the latter may be used.

The presence of lactic acid bacteria in the malt culture is not necessary but it is well to use yeast cells which are accustomed to live together with lactic acid bacteria.

The sugar solution preferably consists of ordinary molasses.

In the preferred embodiment of the invention 3 parts of the lactic acid bacteria culture and 3 parts of the malt culture are mixed with 4 parts of molasses, and 1 part of the mixture thus produced is added to 10 parts of the green fodder.

In the experiments referred to it was found that the fodder when kept for six months is in a very good condition with the exception of a thin layer at the surface of the mass. It is of yellow-brown colour and has a strongly aromatic malty flavour. pH is from 4.45 to 4.25. The proportion of dry substance is very closely the same as in the corresponding quantity of the original product. It may be reduced by 1 to 2%. The proportion of protein calculated as raw protein with subtraction of ammonia protein will be somewhat greater than in the corresponding quantity of the original fodder. The "corresponding" quantity is to be understood in the sense that it refers to a quantity contained in a bag placed in the interior of the mass during the deposition of the fodder.

Taking into consideration that the formation of acid necessitates a utilisation of dry substance and of protein the lack of decrease in the proportion of dry substance and the increase in the proportion of protein must of course be due to the quantity of such substances added exceeding the quantity used for the biological process. In order to be able to compare the present method with other methods in which such substances are not added to the fodder, the loss in dry substances and in raw protein has been calculated taking into consideration the proportion thereof contained in the added material. It has then been found that in the experiment referred to above the loss in dry substance is only 19% and the loss in raw protein is only 11%. In the series of experiments referred to the same quantity of the same fodder was also deposited with the addition of inorganic acids to produce a similar pH according to the A. I. V. method. The loss in dry substance was 19% and the loss in raw proteins was 28%. Similarly when depositing the fodder with molasses alone the losses were 30 and 23% respectively. When deposited with lactic acid bacteria culture alone, the proportions were 34% and 33% respectively.

On the other hand when the proportion of molasses was reduced to ¼ the proportion mentioned above or when the addition of molasses was completely omitted the loss will still be less than in the known methods, for instance in the latter case 16% and 16% respectively. It must be remembered that in this case sugar is still added in the form of lactose from the milk and of the sugar formed by the saccharification of the starch by diatase.

In all cases when the deposition was made in accordance with the present method, the fodder was of good quality and of the characteristic malty flavour which is much appreciated by the cattle.

It is to be understood that the grouping of the addition to be made according to the present method can be altered, thus the mash of starch-containing materials and diastase may be added without the addition of microorganism thereto and the two cultures of microorganisms may be added separately or together in any suitable sugar-containing fluid. The particular addition of a concentrated sugar solution may be omitted as mentioned above and, if so desired, more sugar may be added in other forms, for instance in the form of skimmed milk or buttermilk.

The diastase may be added in the form of any diastase-containing material such as malt or extract of malt or dry preparations of diastase. The starch may be any cereal flour such as more or less pure flour of rye, wheat, corn, etc. Other sources of starch may also be used such as potatoes or tapioca.

The sugar may be of any origin provided that it is fermentable in the fodder. Thus wood sugar or any other available form of glucose may be used. I prefer particularly to supply at least a part of the sugar in the form of a sugar-containing waste product from dairy or other milk-treating trades such as skimmed milk or buttermilk.

I claim:

1. Method of preserving green fodder comprising the steps of adding to the fodder lactic acid bacteria and a culture of living yeast cells in a liquid sugar-containing medium, and diastase to the fodder and depositing and covering the same to exclude the admission of air thereto and leaving the fodder thus deposited and covered to stand to develop lactic acid therein.

2. Method of preserving green fodder comprising the steps of adding to the fodder lactic acid bacteria and a culture of living yeast cells in a liquid containing starch, diastase and water together with sugar formed from said starch by the action of diastase thereon and depositing and covering the fodder to substantially prevent the admission of air thereto and leaving the fodder to stand to develop acid therein.

3. Method of preserving green fodder comprising the steps of adding to the fodder a culture of lactic acid bacteria in a waste product from the milk treating trades; a culture of living yeast cells in a liquid containing starch, diastase and water together with sugar formed from said starch by the action of diastase thereon; and a concentrated solution of sugar and depositing and covering the fodder with the said addition to exclude the admission of air thereto and leaving the fodder thus deposited and covered to develop lactic acid therein.

4. Method of preserving green fodder comprising the steps of adding to the fodder a culture of lactic acid bacteria in skimmed milk; and a culture of living yeast cells in a liquid containing a cereal flour, a diastase-containing product and water; and liquid molasses and depositing and covering the fodder with the said addition so as to exclude the admission of air thereto and leaving the fodder thus deposited and covered to stand to develop lactic acid therein.

5. Method of preserving green fodder comprising the steps of depositing subsequent layers of fodder in a container and adding to each layer lactic acid bacteria, yeast, diastase, starch and sugar and covering the deposited layers to exclude the admission of air thereto and leaving the fodder thus deposited and covered to stand to develop acid therein.

6. Method of preserving green fodder comprising the steps of adding to the fodder 10% by weight of a mixture of a culture of lactic acid bacteria in skimmed milk, with equal parts of a culture of yeast and lactic acid bacteria in a mash of cereal flour and a diastase-containing material, and somewhat in excess of an equal part of fluid molasses and depositing and covering the fodder so as to exclude the admission of air thereto and leaving the fodder thus deposited and covered to develop lactic acid therein.

7. The method of preserving green vegetable matter adapted for fodder which comprises treating said vegetable matter with lactic acid bacteria culture, malt culture, and concentrated sugar solution, and permitting the mass to ferment under substantially anaerobic conditions.

8. A method of preserving green fodder comprising adding to the fodder virulent lactic acid bacteria, virulent yeast cells, diastase, starch and sugar and storing the fodder in an enclosed space whereby the admission of air to the interior parts will be prevented.

OTTO HANSEN.